C. F. JENKINS.
MOTION PICTURE APPARATUS.
APPLICATION FILED MAY 19, 1919. RENEWED APR. 5, 1921.
1,378,462.   Patented May 17, 1921.
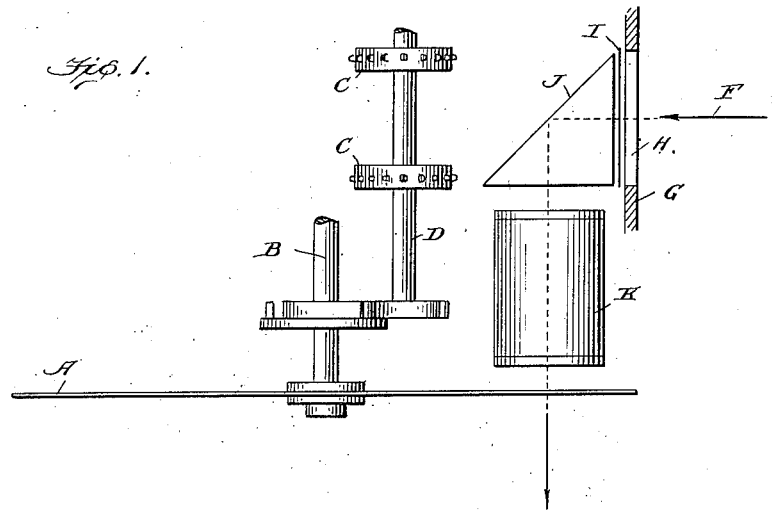
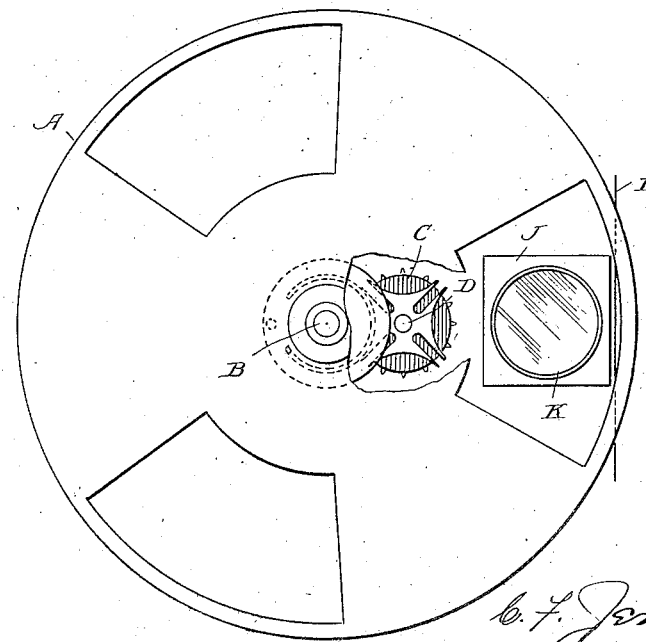

UNITED STATES PATENT OFFICE.

CHARLES FRANCIS JENKINS, OF WASHINGTON, DISTRICT OF COLUMBIA, ASSIGNOR TO THE GRAPHOSCOPE COMPANY, OF NEW YORK, N. Y., A CORPORATION OF DELAWARE.

MOTION-PICTURE APPARATUS.

1,378,462.  Specification of Letters Patent.  Patented May 17, 1921.

Application filed May 19, 1919, Serial No. 298,264. Renewed April 5, 1921. Serial No. 458,697.

*To all whom it may concern:*

Be it known that I, CHARLES FRANCIS JENKINS, a citizen of the United States, and resident of Washington, in the District of Columbia, have invented certain new and useful Improvements in Motion-Picture Apparatus, of which the following is a specification, reference being had therein to the accompanying drawing.

In motion picture machines of the ordinary type the plane of the film at the exposure point is parallel to the plane of the shutter, and necessarily so since both are interposed in the direct path of the light beam from its source to the screen. In consequence of this arrangement, to coördinate the movements of the film and shutter the shutter shaft and the drum shaft, which is perpendicular thereto, are connected by bevel gears. Such gears, even if originally having the almost absolute accuracy of movement giving the steadiness required in modern pictures, very soon lose their accuracy of movement. This evil is obviated by so changing the arrangement that the shutter shaft and a second shaft driving the drum, intermittently or otherwise, may be parallel and then connecting the two shafts by devices whereby one drives the other at exactly a predetermined rate. This simplifies construction, and avoids noise and practically eliminates such wear as results in inaccuracy of movement.

In the accompanying drawings,

Figure 1 is a plan view of devices embodying this invention.

Fig. 2 is a view looking from the left in Fig. 1.

As in ordinary machines the film as a whole runs in a plane perpendicular to the shaft of the driving sprocket drum, but as shown here the shutter shaft is made parallel to that shaft and the light beam is deflected from its initial direction by a prism or mirror and sent to a screen parallel to that initial direction.

In these views, chosen to show one of many possible embodiments of the invention, A represents a common shutter, B its shaft, C a film sprocket drum shown as mounted on a shaft D parallel to B, and operatively connected therewith by a Geneva movement whereby the shutter shaft B drives the film drum shaft D intermittently. F represents any source of light, G a plate having the usual exposure aperture H past which film I is fed by the drum, J a prism which deflects the light beam to a projecting lens K whence it passes through the shutter to the screen.

Obviously, making the shafts parallel and driving one from the other lug does not depend upon the use of the Geneva movement, but this movement gives in an extremely simple way the proper intermittent movement, where such movement is desired. Other connecting gearing having its two elements in the same plane might be used.

What I claim is:

1. The combination with a driving shaft carrying a shutter, a parallel shaft carrying a film feeding drum, and an adjacent plate parallel to the shafts and having an exposure opening across which film is fed, of two mutually engaging gears on the shafts, respectively, a projecting lens lying between said opening and the shutter, and means for deflecting to the lens light coming through the opening.

2. The combination with a driving and a driven shaft, a plate having an exposure opening, and a projecting lens, all parallel and adjacent, of gears, in a plane, connecting the two shafts, a shutter mounted upon the driving shaft, a film feeding device mounted upon the other shaft, and means for deflecting light from the opening to said lens.

In testimony whereof I hereunto affix my signature.

CHARLES FRANCIS JENKINS.